Patented Sept. 25, 1934

1,975,061

UNITED STATES PATENT OFFICE 1,975,061

ANTHRAQUINONE DYESTUFFS AND THEIR APPLICATION

Norman Hulton Haddock, Frank Lodge, and Colin Henry Lumsden, Blackley, Manchester, England, assignors to Imperial Chemical Industries Limited, a corporation of Great Britain No Drawing. Application September 11, 1933, Serial No. 689,044. In Great Britain September 1, 1932

11 Claims. (Cl. 260—60)

This invention relates to the manufacture of new anthraquinone dyestuffs adapted to give fast dyeings especially on animal fibers.

According to this invention we acylate an amino-anthraquinone or a derivative thereof with the acid halide of a dinitro-diaryl-disulfide-dicarboxylic acid in which the nitro groups are in ortho position to the —S—S— linkage, or with the acid itself, in the presence of an appropriate agent; and we reduce the disulfide obtained to the corresponding ortho-amino-mercaptan, which is then treated with a halogeno-acetic acid to give an ortho-amino-thioglycollic acid. Alternatively, we reduce the dinitro-diaryl-disulfide-dicarboxylic acid to the corresponding ortho - amino - mercapto - aryl - carboxylic acid, treat this with halogeno-acetic acid and dehydrate the product to the lactam form; the so-obtained lactam carboxylic acid is used for acylating the amino-anthraquinone, and the acyl-amino-anthraquinone obtained is then hydrolyzed (delactamized). The operations may be represented by the following equations:

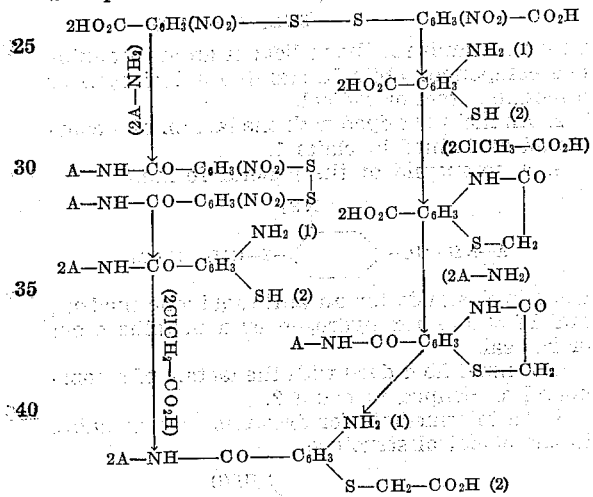

where A stands for anthraquinone or a substituted anthraquinone and the other symbols have their usual significance.

The new dyestuffs may be applied to the fiber, to give fast dyeings, in the manner already indicated in copending applications Serial Nos. 607,008 and 641,114.

As examples of dinitro-diaryl-disulfide-dicarboxylic acids which may be used according to the invention we mention 2,2'-dinitro-4,4'-dicarboxy-diphenyl-disulfide; 2,2'-dinitro-5,5'-dicarboxy-diphenyl-disulfide; 2,2'- dinitro - 5,5'- diethoxy-4,4'-dicarboxy-diphenyl-disulfide; and 2,2'-dinitro- 6,6'- dicarboxy - diphenyldisulphide. It will be clear, however, that any other dicarboxy-dinitro-diaryl-disulfide of the benzene, naphthalene or anthracene series may be employed.

As amino-anthraquinones which may be used we instance those mentioned in British Specification No. 2702/09, the more complex compounds obtained by debenzoylating the dyes described in British specification No. 29352/10, and the amino-anthraquinone acridones and amino - anthraquinone - thioxanthones. It will be clear thus that our invention includes compounds which contain but one anthraquinone nucleus which is substituted by one/or more substituents of the form

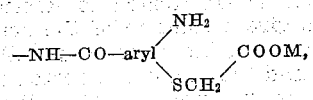

as well as compounds which contain more than one anthraquinone nucleus, each of which or only one of which may carry a substituent of said form. It will be clear also, that the anthraquinone nucleus may be further substituted by simple or auxochromic substituents, such as hydroxy, methyl, methoxy, nitro, chloro, aryl-amino and the like, or it may be substituted by complex substituents which in themselves may possess chromophoric configurations, such as the acridone ring, the xanthone ring, the benzoyl-amino group and the like.

The following examples illustrate but do not limit our invention. The parts are by weight.

Example 1

22 parts of 2,2'-dinitro-4,4'-dicarboxy-diphenyl-disulfide, 15 parts of thionyl chloride and 200 parts of nitrobenzene are warmed with stirring at 100–110° C. under reflux for 20 hours. After this time, the acid chloride which has formed has dissolved to a clear solution in the nitrobenzene. 22 parts of 1-amino-anthraquinone are now added and the mixture is stirred for 2½ hours at 130–135° C. Hydrochloric acid is evolved and the mixture thickens. After cooling to 40° C. the yellow crystalline mass is filtered off and washed successively with nitrobenzene and alcohol.

The so-obtained compound is treated at 30° C. for ½ hour with 2000 parts of water, 200 parts of 33% caustic soda solution and 120 parts of sodium hydrosulfite, a clear solution being formed. 80 parts of sodium chloro-acetate are now added and the stirring is continued at 60–70° C. for 1 hour. Sufficient hydrogen peroxide to oxidize the leuco anthraquinone compound, and sufficient salt to precipitate the sodium salt of the thioglycollate formed, are added. The precipitate is filtered and washed with brine. The product is an orange yellow powder soluble in warm water to a clear yellow solution and has presumably the constitution:

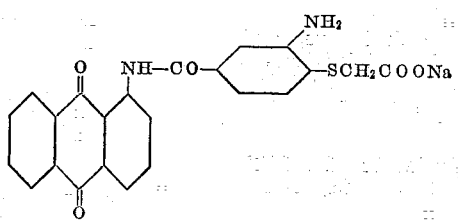

It may be applied to the fiber as described in the manner referred to above. As an illustration, the following method is given:

0.8 parts of dyestuff powder are dissolved in 400 parts of boiling water, and 8 parts of well wetted wool are added, followed by 8 parts of a 10% solution of Glauber's salt. The solution is boiled for 1 hour, after which the fiber is removed, rinsed in cold water, and entered into a boiling solution of 10 parts of 7% aqueous hydrochloric acid and 200 parts of water. After 15 minutes the lactamization is complete and the fiber is rinsed in dilute sodium carbonate and dried. The wool is dyed orange yellow which on lactamization changes to a pure yellow, exceptionally fast to washing and potting.

Example 2

22 parts of 2,2'-dinitro-4,4'-dicarboxy-diphenyl-disulfide are treated as described in Example 1 to give a solution of the acid chloride. 25 parts of 1-amino-4-methoxy-anthraquinone are added and the mixture is stirred at 130–135° C. for ¾ hour and finally at 190° C. for some minutes. On cooling, orange red crystals separate, which are filtered and washed with alcohol. The product is converted to the water soluble dyestuff as described in Example 1. This is a bluish red powder soluble in warm water to an orange solution.

Wool is dyed in orange shades which on lactamization change to orange scarlet. The lactamized shade is of excellent fastness to washing and potting, in this respect being considerably superior to the unlactamized shade.

Example 3

By substituting for the 1-amino-4-methoxyanthraquinone of Example 2, an equivalent weight of 1-amino-4-hydroxyanthraquinone, and carrying out the same series of operations, a product is obtained which after lactamization on wool gives an orange scarlet shade similar to that of the dyestuff described in Example 2.

Example 4

By substituting for the 1-aminoanthraquinone of Example 1 an equivalent weight of 1-amino-5-methoxyanthraquinone, a product is obtained which on lactamization gives a redder shade of yellow than the dyestuff described in Example 1.

Example 5

By substituting for the 2:2'-dinitro-4:4'-dicarboxydiphenyldisulphide of Example 1, 22 parts of 2:2'-dinitro-6:6'-dicarboxydiphenyldisulphide, and carrying out the same series of operations, an orange yellow powder is obtained having the constitution

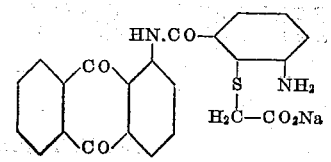

When applied to the fibre and lactamized it gives shades similar to those of the product described in Example 1.

Example 6

By substituting for the 1-aminoanthraquinone of Example 5 an equivalent weight of 1-amino-4-methoxyanthraquinone, a dyestuff is obtained which on application to wool and lactamization yields a bright scarlet shade of excellent fastness to potting.

Example 7

By substituting for the 1-aminoanthraquinone of Example 1 an equivalent amount of 1-amino-5-chloroanthraquinone, a dyestuff is obtained which yields on lactamization a redder shade of yellow than that of the product of Example 1.

Example 8

By substituting for the 1-aminoanthraquinone of Example 1 an equivalent amount of 1-amino-4-methylaminoanthraquinone, a dyestuff is obtained which gives blue-violet shades on wool, changing on lactamization to a reddish blue.

It will be understood that many variations and modifications are possible in our preferred mode of procedure as above set forth, without departing from the spirit of this invention.

We claim:

1. A dyestuff compound of the general formula

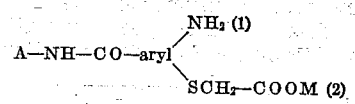

where A stands for the radical of an anthraquinone compound, while M stands for hydrogen or a metallic atom or radical.

2. Animal fiber dyed with the lactam of a compound as defined in claim 1.

3. A compound of the general formula

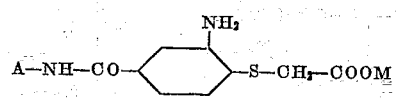

wherein A stands for an anthraquinone nucleus, and M stands for hydrogen or a metallic atom or radical.

4. Animal fiber dyed with the lactam of a compound as defined in claim 3.

5. An intermediate for dyestuffs corresponding to the chemical structure

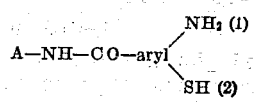

wherein A stands for the radical of an anthraquinone compound.

6. An intermediate for dyestuffs corresponding to the general formula

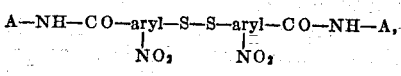

wherein A stands for the radical of an anthraquinone compound.

7. The process of preparing a dyestuff intermediate which comprises reacting an amino anthraquinone with the acid chloride of a dinitro-diaryl-disulfide-dicarboxylic acid, in which the nitro groups are in ortho position to the —S—S— linkage.

8. The process of preparing a dyestuff intermediate which comprises reacting an amino anthraquinone with the acid chloride of a dinitro-diaryl-disulfide-dicarboxylic acid, in which the nitro groups are in ortho position to the —S—S— linkage, and reducing the compound thus obtained to the ortho-amino-mercaptan form.

9. The process of preparing a dyestuff intermediate which comprises reacting an amino anthraquinone with the acid chloride of a dinitro-diaryl-disulfide-dicarboxylic acid, in which the nitro groups are in ortho position to the —S—S— linkage, reducing the compound thus obtained to the ortho-amino-mercaptan form, and reacting upon the latter body with a halogeno-acetic acid.

10. The process of preparing a dyestuff compound which comprises reacting a lactam carboxylic acid compound as obtainable by dehydrating a carboxy-ortho-amino-aryl-thioglycollic acid, with an amino-anthraquinone compound, to form the corresponding aroyl-amino-anthraquinone derivative.

11. The process of preparing a dyestuff compound which comprises reacting a lactam carboxylic acid compound as obtainable by dehydrating a carboxy-ortho-amino-aryl-thioglycollic acid, with an amino-anthraquinone compound, to form the corresponding aroyl-amino-anthraquinone derivative, and hydrolyzing the product to transform it again into the ortho-amino-thioglycollic acid form.

NORMAN HULTON HADDOCK.
FRANK LODGE.
COLIN HENRY LUMSDEN.